(12) United States Patent
Falk

(10) Patent No.: US 6,908,393 B1
(45) Date of Patent: Jun. 21, 2005

(54) TORQUE LIMITING COUPLING DEVICE

(75) Inventor: Curt Falk, Hudiksvall (SE)

(73) Assignee: Curt Falk AB, Hudiksvall (SE)

( * ) Notice: Subject to any disclaimer, the term of this patent is extended or adjusted under 35 U.S.C. 154(b) by 0 days.

(21) Appl. No.: 10/089,072

(22) PCT Filed: Oct. 27, 2000

(86) PCT No.: PCT/SE00/02101

§ 371 (c)(1),
(2), (4) Date: Apr. 8, 2002

(87) PCT Pub. No.: WO01/31219

PCT Pub. Date: May 3, 2001

(30) Foreign Application Priority Data

Oct. 29, 1999 (SE) .................................. 9903911

(51) Int. Cl.$^7$ .............................................. F16D 9/02
(52) U.S. Cl. ......................................... 464/10; 464/31
(58) Field of Search .................... 464/10, 31; 192/56.5, 192/56.55

(56) References Cited

U.S. PATENT DOCUMENTS

| | | | |
|---|---|---|---|
| 2,447,384 A | | 8/1948 | Wolff |
| 3,193,068 A | * | 7/1965 | Greve et al. .............. 464/31 X |
| 3,751,941 A | * | 8/1973 | Stiff ............................ 464/31 |
| 4,132,300 A | * | 1/1979 | Grandia ..................... 464/31 X |
| 4,341,484 A | | 7/1982 | Peterson et al. |
| 5,069,320 A | * | 12/1991 | Falk ......................... 464/10 X |

FOREIGN PATENT DOCUMENTS

| | | | |
|---|---|---|---|
| GB | 2 268 569 | 1/1994 | |
| SU | 1673763 A2 | * 8/1991 | .................. 464/31 |
| WO | 90/00231 | 1/1990 | |

OTHER PUBLICATIONS

Machinery's Handbook, 25$^{th}$ ed., New York, International Press, 1996. pp. 2473 & 2474. TJ151.M3 1996.*

* cited by examiner

*Primary Examiner*—Greg Binda
(74) *Attorney, Agent, or Firm*—Jacobson Holman PLLC

(57) ABSTRACT

A torque-limiting coupling device including a cylindrical sleeve and a cylindrical shaft in radially tensioned frictional engagement for transferring torque up to a torque limit that corresponds to the radial tension and at which the sleeve begins to rotate relative to the shaft. The device also includes at least one pump mechanism which is adapted to be driven to pump liquid to the interface between co-acting surfaces of the sleeve and shaft upon relative rotation between the sleeve and the shaft. The shaft includes a surface layer that defines one of the co-acting surfaces and that is made of a material, e.g. tombak, whose plasticizing limit is lower than the plasticizing limit of the material in the co-acting surface of the sleeve. The surface layer may include cavities which enable the surface layer to take a smaller radial thickness after plasticization thereof.

20 Claims, 1 Drawing Sheet

TORQUE LIMITING COUPLING DEVICE

This is a nationalization of PCT/SE00/02101, filed Oct. 27, 2000 and published in English.

BACKGROUND OF THE INVENTION

1. Field of the Invention

The present invention relates to a torque-limiting coupling device having two coaxial, generally cylindrical co-acting surfaces on two co-acting parts in the form of a cylindrical sleeve and a cylindrical shaft, respectively. The sleeve is in frictional engagement with the shaft for transmission of torque up to a limit that corresponds to the frictional engagement and at which the sleeve begins to rotate relative to the shaft. The device further includes a pump mechanism which, upon relative rotation between the sleeve and the shaft, is driven to pump liquid to an interface between the co-acting surfaces, with channels being provided to carry away liquid from the interface so as to restore the frictional grip after the torque limit has been exceeded.

2. Description of the Related Art

A coupling device of the kind in question is disclosed in WO 90/00231, which corresponds with U.S. Pat. No. 5,069,320. This known device generally functions well. Devices of this kind are often used in steel rolling mills between a drive motor, for instance an electric motor, and a roll. The power transferred may be in the order of 20,000 kW. Idling costs in respect of such a rolling mill may lie in the order of up to 100,000 Swedish kroners (SEK)/hour.

In the case of the areas of use concerned, the device is triggered with a relatively low frequency, for instance a frequency in the region of once every five years to up to 300 times annually. A typical activating frequency is twenty times per annum.

Basically, the coupling device comprises two axially, generally cylindrical interacting surfaces on two interacting parts in the form of a cylindrical sleeve and a cylindrical shaft respectively, wherein the sleeve is in a torque-transmitting frictional contact with the shaft for transmission of torque up to a corresponding limit, after which the sleeve begins to slide or slip relative to the shaft. The frictional engagement can be adjusted to a selective level with the aid of some suitable technique. For instance, the sleeve may include a concentric ring-chamber that can be placed under pressure. The coupling device includes one or more pumps that function to pump liquid from a liquid store to the gap between the interacting surfaces, such that the liquid will form a hydrostatic layer together with said interacting surfaces. The pumps are intended to be driven by relative rotation between said parts. As a result of pumping liquid in between the mutually co-acting surfaces, said surfaces are able to slide relative to one another as soon as the set torque is exceeded. This enables damage to the coupling device and to the motor or rolling mill to be avoided. A torque-limiting coupling device of this known kind need only rotate through barely one revolution in order to generate an hydrostatic layer for which the torque is reduced to a level close to zero.

When the device is triggered, it is necessary to stop the drive completely. The pumps in the coupling device will then stop pumping liquid (oil) in between the mutually interacting surfaces. This enables the liquid to drain away through channels, wherewith the frictional engagement between said mutually interacting surfaces is re-established within the space of about 1 minute. The torque limit can be chosen within a wide range, and can be set with a high degree of accuracy, for instance ±10% from a desired value. The coupling device also has compact dimensions.

Problems associated with this known device reside in the possibility of all or part of the liquid/oil contained in the device leaking away before the device is triggered, or of by a change in the properties of the oil with time, contamination of the oil with particles that can be formed, for instance, in conjunction with triggering the device and that clog valves, filters, and disturb or interfere with the function of the device, and so on.

There is therefore a certain risk that this known device will malfunction when triggered. Malfunctioning of the device would mean that the mutually interacting surfaces would not be separated sufficiently and that insufficient oil would be pressed in between the interacting surfaces. The malfunction may then cause a very high torque to be transferred via the device in spite of the torque-limiting mechanism, therewith resulting in damage to the motor and driven equipment for instance, and also such as to cause serious damage to the coupling device itself. Particularly with a view to the consequence of such a malfunction (compare the idling cost), the type of device concerned has not found particularly wide use in practice, despite the ability of the device to enable automatic and fast resetting with normal triggering of the device, and thereby a fast return to plant operation after having removed or rectified the triggering cause.

SUMMARY OF THE INVENTION

An object of the invention is to provide a further development of the device for limiting the effect of a device malfunction, and thus limit the temporary shutdown time required for the arrangement to reset the device subsequent to a malfunction occurring when the device is triggered as a result, for instance, of insufficient oil being pumped in between the mutually interacting surfaces of the device.

This object is achieved with a device having two coaxial, generally cylindrical co-acting surfaces on two co-acting parts in the form of a cylindrical sleeve and a cylindrical shaft, respectively. The sleeve is in frictional engagement with the shaft for transmission of torque up to a limit that corresponds to the frictional engagement and at which the sleeve begins to rotate relative to the shaft. One of the co-acting parts has a base with an outer surface layer thereon which defines one of the co-acting surfaces which is made of a material that has a plasticizing limit which is lower than the plasticizing limit of the material in the co-acting surface of the other part. The device further includes a pump mechanism which, upon relative rotation between the sleeve and the shaft, is driven to pump liquid to an interface between the co-acting surfaces, with channels being provided to carry away liquid from the interface so as to restore the frictional grip after the torque limit has been exceeded.

In further embodiments of the devices will be the outer surface layer includes cavities which enable the surface layer to move away from the co-acting surface of the other part upon plasticization. These cavities may consist of grooves disposed around the circumference of the outer surface layer. The outer surface layer may be made of tombak, while the other co-acting surface is made of steel, and the co-acting parts may be mutually tensioned radially in order to establish the frictional grip between them.

In addition, according to further embodiments of the device, the outer surface layer may include cavities which allow the surface layer to take a radial thickness that is smaller than the radial distance between the surface of the base and the co-acting surface of the other part subsequent to plasticization of the surface layer and radially relieving the co-acting parts of load. The co-acting surfaces may further be comprised of a material whose coefficient of thermal expansion is higher than the coefficient of thermal expansion of the base.

The coupling can be readily renovated subsequent to plasticization (which may lead to melting of the surface layer), by heating said layer and that part (the shaft) that carries the surface layer. Because the surface layer is comprised of material (tombak) that has a high coefficient of thermal expansion, the layer will loosen from the base of said part (the shaft) and be easily drawn off the shaft. A replacement surface layer in the form of a tombak-sleeve can be simply inserted into/pushed over the part concerned (10, 20) and fastened thereto by means of a glue joint, for instance, this joint being destroyed by the heat applied in the renovating process or in conjunction with plasticization of the surface layer.

BRIEF DESCRIPTION OF THE DRAWINGS

The invention will now be described by way of example with reference to the accompanying drawing.

DETAILED DESCRIPTION OF THE PREFERRED EMBODIMENTS

Figure 1:
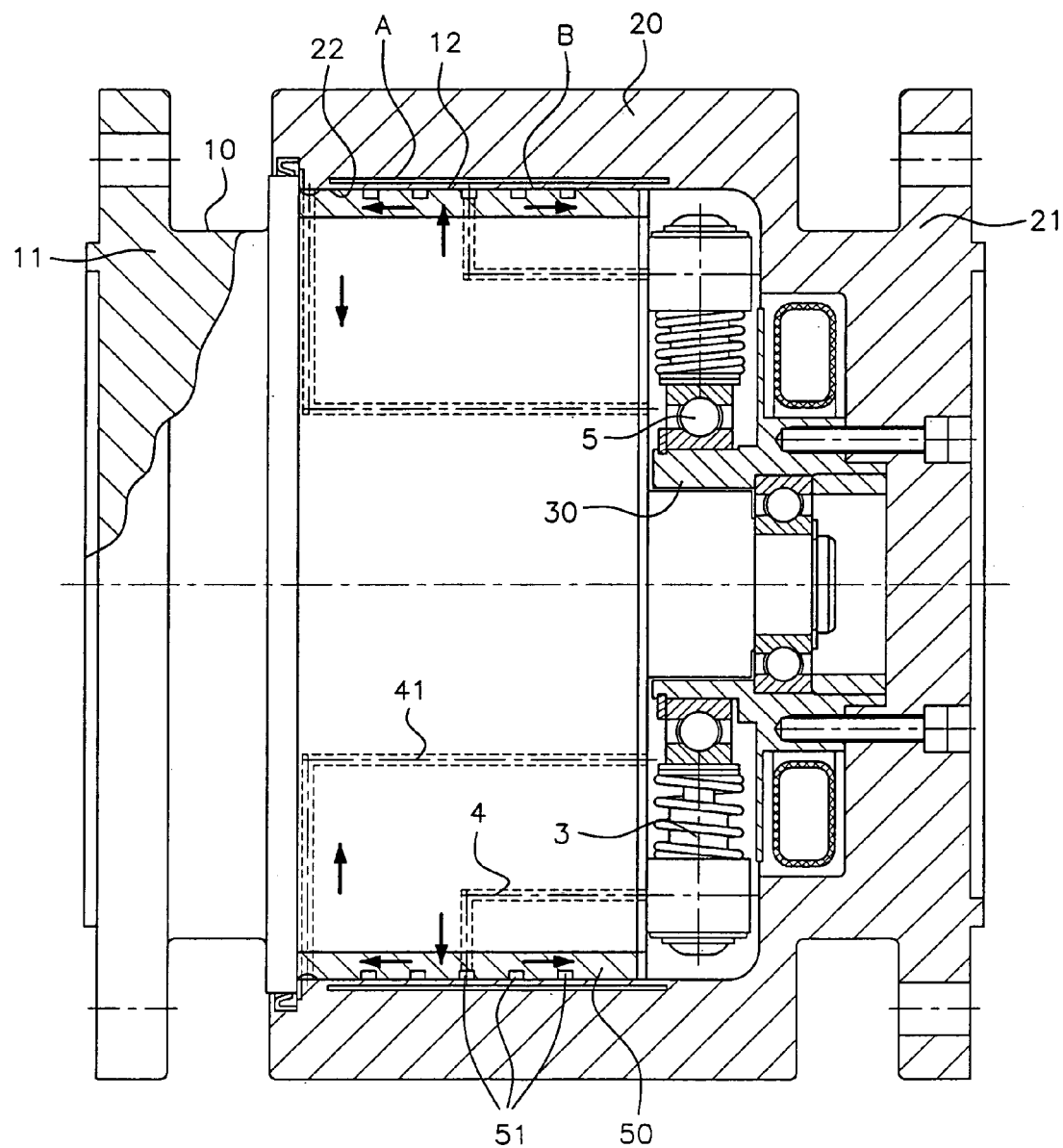
FIG. 1 is a schematic axial sectioned view of a torque-limiting coupling device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The device illustrated in FIG. 1 is based fundamentally on the device according to U.S. Pat. No. 5,069,320 to Falk, the teachings of which are hereby incorporated in this document by reference as if fully set forth herein. In particular, the subject matter of U.S. Pat. No. 5,069,320 (the '320 patent) is relied upon as fully describing a pump mechanism that, in response to relative rotation between a cylindrical sleeve fitted on a cylindrical part, pumps liquid between the engagement surfaces of the sleeve and part for the purpose of negating the friction therebetween. Such a pump mechanism is illustrated in FIG. 1 of the '320 patent and described in column 2, line 13, through column 3, line 30, thereof. The general operation of this pumo mechanism has also been summarized herein in the foregoing description of the related art and thus is not repeated here.

While the interacting surfaces of conventional devices are comprised of lightly alloyed carbon steel that has been nitrogen case hardened to a depth of about 0.3 mm and has a hardness of about 700 Vickers, according to the present invention one of the parts carries a surface layer which defines one of the interacting surfaces and which is comprised of a material that has a substantially lower plasticizing limit than the interacting surface of the other part. The surface layer may have a thickness of some millimeters, for instance 5 mm, and may, for instance, be comprised of a tin-copper alloy of the tombak kind, e.g., 90% Cu. 10% Sn, 1% Pb. Such an alloy has an elastic limit of about 100 N/m². The surface layer may also include cavities in the form of grooves on its free surface. These grooves are able to form liquid distribution channels for the bearing function. Alternatively, the cavities in the outer layer may contain other recesses or hollows. The reason for these cavities in the surface layer is to ensure that the surface layer material, for instance when melting, has a volume that is smaller than the space between the sleeve and the shaft which was originally occupied by the surface layer. Because the plasticization is meant to eliminate the transmission of power between sleeve and shaft, the cavities in the surface layer will preferably be dimensioned to take into account the fact that the inner diameter of the sleeve decreases when relieved of load, and that the outer diameter of the shaft increases when the load on the shaft is removed, such that the space available for the surface layer will decrease. The layer material shall thus preferably have a net volume that is smaller than the volume for the space between sleeve and shaft after eliminating the radial stress therebetween, and also with respect to the temperature conditions when plasticizing or melting the surface layer (i.e. corresponding volume deviations in respect of the surface layer, the sleeve and the shaft) so that the sleeve is able in principle to rotate free from contact with the plasticized surface layer subsequent to relative rotation between the sleeve and the shaft. This reduces the risk of the surface layer material being supplied with energy in such quantities as to cause the material to melt as a result of relative rotation between the two main parts of the coupling device.

Plasticization of the surface layer causes successive reduction in the liquid limit or yield stress of the surface layer material. This surface layer limits the torque that is transferred when the hydrostatic bearing function cannot be maintained. The power transmission between the input shaft of the coupling device and its output shaft can be monitored and stopped with the aid of external means, for instance by detecting a possible difference in the speed between the input and output parts of the device, for limiting the relative rotation between the parts.

The present invention is effective in preventing damage to the driven equipment and also to the driving equipment, and also limits damage to the torque-limiting device.

The coupling can be readily renovated subsequent to plasticization (which may lead to melting of the surface layer), by heating said layer and that part (the shaft) that carries the surface layer. Because the surface layer is comprised of material (tombak) that has a high coefficient of thermal expansion, the layer will loosen from the base of said part (the shaft) and be easily drawn off the shaft. A replacement surface layer in the form of a tombak-sleeve can be simply inserted into/pushed over the part concerned (10, 20) and fastened thereto by means of a glue point, for instance, this joint being destroyed by the heat applied in the renovating process or in conjunction with plasticization of the surface layer.

As shown in FIG. 1 as set forth herein, the coupling device basically comprises a cylindrical trunnion 10 and a sleeve 20 that embraces the trunnion/shaft 10, said shaft 10 and sleeve 20 having respective flange connections 11 and 21 for connecting up a drive system, for instance a large electric motor and a roll belonging to a steel rolling mill. The sleeve 20 has an inner surface 22 that co-acts with an outer surface 12 on the shaft 10. There is included in the sleeve wall an oil chamber A that can be placed under pressure by pumping in oil at a pressure, e.g., in the range of 0–50 mPa, to cause frictional engagement at the interface B between the mutually co-acting surfaces 12, 22. The frictional grip and the maximum torque that can be transferred are determined by the oil pressure in the chamber A. After pumping oil into the chamber A via a filling channel (not shown), a valve (not shown) in the channel is closed.

The cylindrical sleeve part 20 includes a hub 30 which is mounted for rotation co-axially with the sleeve part 20. The hub 30 carries on its outside a bearing 5 which is eccentric with respect to the hub axle. A number of oil pumps 3 operate radially between the bearing 5 and an inner surface of said sleeve part. The pumps have associated channels 4 through which oil is pumped to the interface B, for instance to its longitudinal center region. The oil spreads along the interface and can, for instance, be collected-up via a channel 41 at one end of the interface B and returned to the pump space. A quantity of oil may be enclosed internally in the pump space, so as to be sucked up by respective pumps immediately and pressed out to the interface B upon relative rotation between the parts 10, 20. The pumps 3 will be set into operation upon such relative rotation, owing to the eccentricity of the outer surface of the hub 30 (the eccentric position of the bearing 5 relative to the parts 10, 20). The outer surface 12 of the shaft 10 that co-acts with the sleeve 20 has a surface layer 50 of tombak (90% Cu, 10% Sn, 1% Pb) that has a first plasticizing limit. The layer 50 has grooves 51 in its free main surface. The grooves 51 may also be utilized as oil distributing channels for distributing oil from the pumps 3. Oil is pumped from the pump 3 to the longitudinal center region of the interface B, via the channel 4, and flows from there axially to both ends of the interface B, as shown by the arrows in the Figure. A flow of oil is transferred directly back to the pump chamber when collected via the channel 41 extending back to the oil pump chamber.

The space between the shaft 10 and the sleeve 2 is essentially filled by the layer 50, with the exception of the grooves 51 in said layer. The grooves 51 also serve to receive parts of the layer 50 that are plasticized as a result of relative rotation between the parts 10, 20. The surface 22 of the sleeve part 20 has a second plasticizing limit and is comprised of steel and co-acts with the tombak surface of the layer 50. The first plasticizing limit of the surface layer 50 is lower than the second plasticizing limit of the inner surface 22 of the sleeve 20. The tombak layer 50 is able to transfer the torque at normal torque. However, when the torque load exceeds the pre-set value, the steel surface 22 will begin to slide relative to the tombak layer 50. The friction heat and/or the relative movement causes the layer 50 to deform rapidly, as a result of plasticization or melting. The grooves 51 enable the material in the surface of the layer 50 to be displaced radially in a direction away from the surface 22. Subsequent to the sleeve and shaft having been thus relieved of load in the radial direction, and in view of the state and temperature of the deformed surface layer 50, the net volume of the layer should be accommodated appropriately in the space between the sleeve and the shaft. This reduces the risk of the material of layer 50 receiving so much energy as to cause such material to actually melt. The plasticization results in a successive reduction in the liquid limit of the material, i.e., that point at which the material will turn to a liquid. Normally, in the absence of excessive plasticization or temperature, the material of layer 50 will not pass into a molten phase. As a result of plasticization of the material 50 and the displacement of said material, the power transmission between the parts 10, 20 will be limited even if the pumps 3 are not able to pump oil into the interface B. In other words, if slippage has begun to occur between the parts 10, 20 due to excess torque and the pumps malfunction such that there is insufficient oil between the mutually interacting surfaces to prevent damaging friction caused by the relative movement, the plasticization and displacement of the material 50 provides for the creation of sufficient separation between the parts 10, 20 to allow the sleeve 20 to rotate free from contact with the shaft 10.

The frictional engagement between the shaft and the sleeve can, of course, be established with by means other than pressurizing of the hydraulic chamber A as in the illustrated embodiment. For instance, the sleeve and the shaft may be conical and driven axially together so as to achieve a chosen frictional grip, i.e. a chosen upper torque transmission limit. When the sleeve and the shaft have pre-selected dimensions to achieve a given frictional grip, the grip can be achieved by so-called heat shrinkage or by press-fitting the sleeve to the shaft. When the frictional grip is eliminated, i.e. when the radial stress between shaft and sleeve is removed, the outer diameter of the shaft will increase and the inner diameter of the sleeve will decrease. The outer layer should therefore be dimensioned so that its net volume can be accommodated, with a given margin, in the space between the sleeve and the shaft when the friction joint has been eliminated, i.e. when the load on the sleeve and the shaft has been removed radially. Thus, by forming the outer layer 50 with a material that has a relatively low plasticizing limit, it is possible to trigger an initial rotation between the parts 10, 20 in the absence of an oil film therebetween, at a relatively low torque limit that, nevertheless, lies above the torque limit established by the friction grip between the parts 10, 20 as a result of the initial plasticization of the surface layer material. The material of layer 50 can be said to form a lubricant in the interface between shaft and sleeve. When ensuring that the surface layer can be accommodated in the resultant gap between sleeve and shaft after having relieved the same of load in a radial direction, the transfer of energy to the material of the layer 50 is minimized, as is also the transmission of energy between the shaft and the sleeve.

In order for the surface layer to be able initially to transfer energy between the two parts, on the one hand, and to collapse and take a state of considerably smaller radial thickness, on the other hand, the outer layer may also include other recesses or hollows additional to the functional grooves on its free surface, for instance pores or the like, in its initial state.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A torque-limiting coupling device comprising:
   a shaft having a surface layer thereon;
   an outer sleeve frictionally engaging said for transmission of torque up to a preset limit, said outer sleeve rotating relative to said shaft when said torque exceeds said preset limit; and
   a pump mechanism, responsive to said outer sleeve rotating relative to said shaft, for pumping liquid to an interface between said surface layer and an inner surface of said outer sleeve;
   said surface layer having a plasticizing limit which is lower than a plasticizing limit of said outer sleeve inner surface.

2. The torque-limiting coupling device as set forth in claim 1, wherein said surface layer is made of a tin-copper alloy.

3. The torque-limiting coupling device as set forth in claim 2, wherein said surface layer has a thickness of about 5 mm.

4. The torque-limiting coupling device as set forth in claim 2, wherein said alloy as an elastic limit of about 100 N/m².

5. The torque-limiting coupling device as set forth in claim 4, wherein said surface layer has a thickness of about 5 mm.

6. The torque-limiting coupling device as set forth in claim 1, wherein said surface layer further includes cavities on an outer surface thereof which enable said surface layer, upon plasticization thereof, to disengage from said inner surface of said outer sleeve.

7. The torque-limiting coupling device as set forth in claim 6, wherein said cavities include grooves disposed around a circumference of said surface layer.

8. The torque-limiting coupling device as set forth in claim 1, wherein said surface layer is made of tombak and said inner surface of said outer sleeve is made of steel.

9. The torque-limiting coupling device as set forth in claim 1, wherein said surface layer further includes cavities on an outer surface thereof which are dimensioned such that said surface layer, upon plasticization thereof, has a radial thickness that is smaller than a radial distance between said shaft and said inner surface of said outer sleeve when said shaft and said outer sleeve have been radially relieved of load.

10. The torque-limiting coupling device as set forth in claim 9, wherein said cavities include grooves disposed around a circumference of said surface layer.

11. The torque-limiting coupling device as set forth in claim 9, wherein said surface layer is removable from said shaft for replacement thereof following plasticization.

12. A torque-limiting coupling device comprising:
a generally cylindrical shaft having a removable outer surface layer thereon, said outer surface layer having a first plasticizing limit;
a sleeve having a generally cylindrical inner surface which coacts with said outer surface layer, said inner surface having a second plasticizing limit higher than said first plasticizing limit, said sleeve inner surface being in frictional engagement with said shaft through said outer surface layer for transmission of torque up to a preset limit, said sleeve rotating relative to said shaft when said torque exceeds said preset limit; and
a pump mechanism, responsive to said sleeve rotating relative to said shaft, for pumping liquid to an interface between said outer surface layer and said inner surface to reduce friction therebetween;
said outer surface layer, in the event of insufficient liquid at said interface, undergoing plasticization due to said relative rotation between said sleeve and said shaft, said plasticization allowing said sleeve to rotate free from contact with said shaft to limit damage to said sleeve and/or shaft.

13. The torque-limiting coupling device as set forth in claim 12, wherein said outer surface layer is made of a tin-copper alloy.

14. The torque-limiting coupling device as set forth in claim 13, wherein said outer surface layer has a thickness of about 5 mm.

15. The torque-limiting coupling device as set forth in claim 13, wherein said alloy as an elastic limit of about 100 N/m².

16. The torque-limiting coupling device as set forth in claim 12, wherein said outer surface layer further includes cavities therein which enable said outer surface layer, upon plasticization thereof, to disengage from said inner surface of said outer sleeve.

17. The torque-limiting coupling device as set forth in claim 16, wherein said cavities include grooves disposed around a circumference of said outer surface layer.

18. The torque-limiting coupling device as set forth in claim 12, wherein said outer surface layer is made of tombak and said inner surface of said outer sleeve is made of steel.

19. The torque-limiting coupling device as set forth in claim 12, wherein said outer surface layer further includes cavities therein which are dimensioned such that said outer surface layer, upon plasticization thereof, has a radial thickness that is smaller than a radial distance between said shaft and said inner surface of said outer sleeve when said shaft and said outer sleeve have been radially relieved of load.

20. The torque-limiting coupling device as set forth in claim 19, wherein said cavities include grooves disposed around a circumference of said outer surface layer.

* * * * *